(12) United States Patent
Bond

(10) Patent No.: US 8,632,339 B2
(45) Date of Patent: Jan. 21, 2014

(54) APPARATUS FOR SIMULATED DRIVING OF A MOTOR VEHICLE

(75) Inventor: Neville J Bond, Gisborne (AU)

(73) Assignee: Drag Tag Pty Ltd, Victoria (AU)

( * ) Notice: Subject to any disclaimer, the term of this patent is extended or adjusted under 35 U.S.C. 154(b) by 1648 days.

(21) Appl. No.: 11/212,103

(22) Filed: Aug. 26, 2005

(65) Prior Publication Data
US 2006/0057544 A1 Mar. 16, 2006

Related U.S. Application Data

(63) Continuation of application No. PCT/AU2005/000131, filed on Feb. 2, 2005.

(30) Foreign Application Priority Data

Feb. 3, 2004 (AU) .................................. 2004900513

(51) Int. Cl.
G09B 9/04 (2006.01)
(52) U.S. Cl.
USPC ............................................................ 434/62
(58) Field of Classification Search
USPC .............................. 434/62, 66, 67, 69; 73/117
See application file for complete search history.

(56) References Cited

U.S. PATENT DOCUMENTS

| 3,054,287 | A | * | 9/1962 | Lewis ........................ 73/116.08 |
| 3,606,328 | A | | 9/1971 | Delphia |
| 3,750,994 | A | * | 8/1973 | Bieschke ........................ 248/324 |
| 4,393,694 | A | * | 7/1983 | Marten et al. ............... 73/117.02 |
| 4,455,866 | A | * | 6/1984 | Barrigar ...................... 73/116.07 |
| 4,846,686 | A | | 7/1989 | Adams |
| 5,502,481 | A | * | 3/1996 | Dentinger et al. ............... 348/51 |
| 5,618,179 | A | | 4/1997 | Copperman et al. |
| 6,217,177 | B1 | * | 4/2001 | Rost .............................. 359/843 |
| 6,354,838 | B1 | | 3/2002 | Tagge et al. |
| 6,505,503 | B1 | | 1/2003 | Teresi et al. |
| 2002/0018942 | A1 | * | 2/2002 | Brown et al. ..................... 430/5 |
| 2002/0018982 | A1 | * | 2/2002 | Conroy ........................... 434/62 |

OTHER PUBLICATIONS

International Search Report of International Application PCT/AU2005/000131.

* cited by examiner

Primary Examiner — Robert J Utama
Assistant Examiner — Evan Page
(74) Attorney, Agent, or Firm — Pillsbury Winthrop Shaw Pittman, LLP

(57) ABSTRACT

The apparatus described is computer controlled and includes a visual display system with a triple screen arrangement in front of and on the sides of a driver of a vehicle positioned on a chassis dynamometer. Three projectors project virtual scenic imagery onto the triple screen arrangement which spans at least 180° relative to the driver. The virtual scenic imagery has a progression which is dependent upon the speed of at least one of the drive wheels of the motor vehicle, as controlled by the driver, when the motor vehicle is positioned on rollers of the dynamometer. The apparatus may include a steering sensing arrangement for providing signals of steering actions by the driver, which signals are used to deflect the virtual scenic imagery in synchronism with the steering actions of the driver.

18 Claims, 9 Drawing Sheets

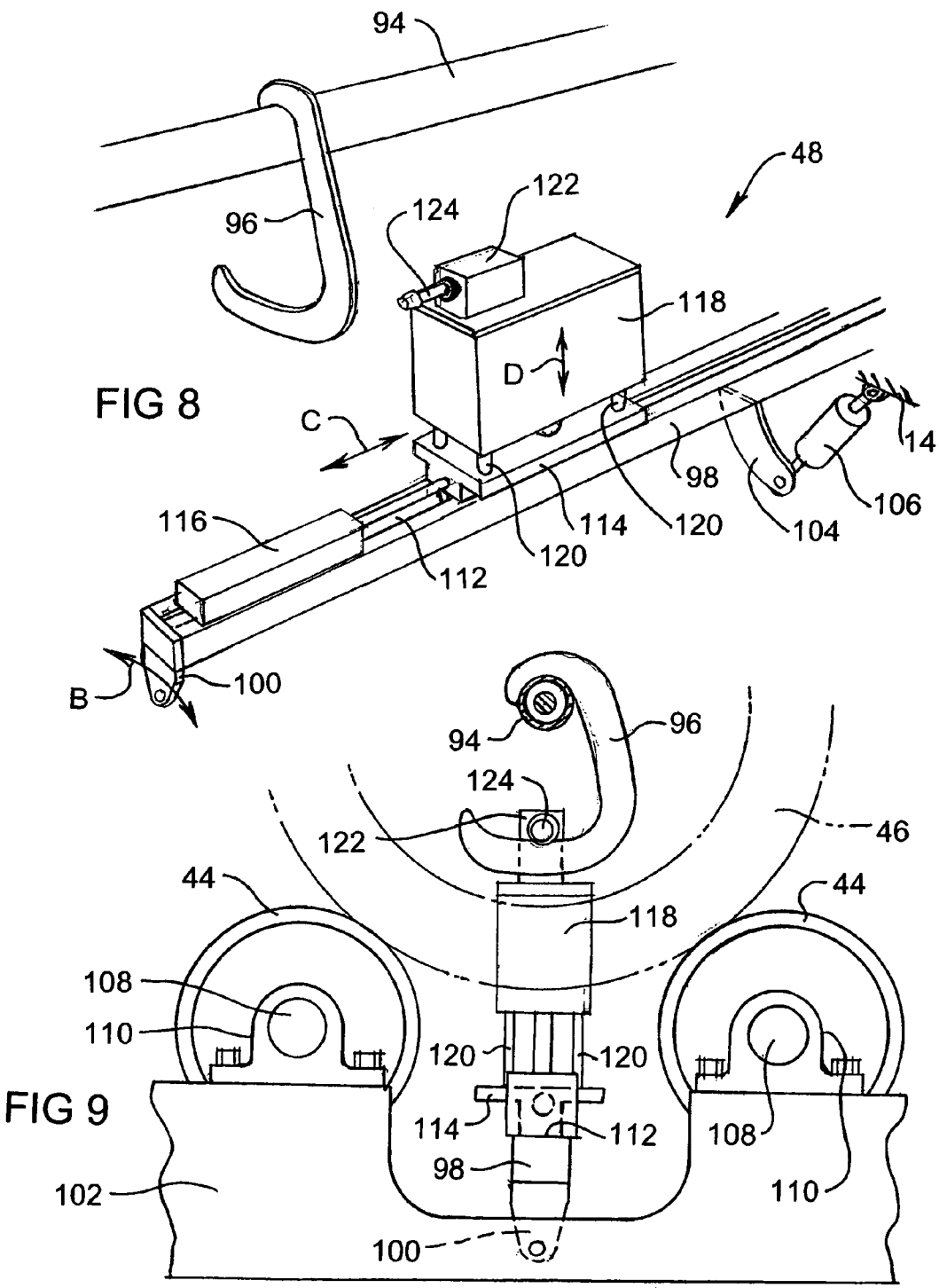

APPARATUS FOR SIMULATED DRIVING OF A MOTOR VEHICLE

CROSS REFERENCE TO RELATED APPLICATIONS

This is a Continuation of PCT/AU2005/000131, filed Feb. 2, 2005, which claims priority to Australian Patent Application No. 2004900513, filed Feb. 3, 2004, the contents of both of which are incorporated herein by reference in their entireties.

TECHNICAL FIELD

The present invention relates to apparatus for simulated driving of a motor vehicle. The apparatus may be set up for driver training purposes or for simulated racing, for example drag or circuit racing. The invention will be described particularly in relation to apparatus for simulated driving of a motor car, however it is to be understood that the invention may have application to other types of vehicles, such as motor cycles, trucks or four wheel drive off-road vehicles.

BACKGROUND

Training for learner drivers for motor vehicles may commence in an actual vehicle either on private property or on a public roadway. In either case, there are risks to safety given the vehicle will be under the control of a person who has no or very little actual experience of how to control a vehicle coupled with his or her unfamiliarity with the specific vehicle in question and its handling characteristics. A further factor is that the learner driver is most likely to be very apprehensive. If the driver training is on a public road, the risk of an accident is increased because of the likely presence of other moving vehicles.

Alternatively, driver training may commence in a vehicle simulator facility. Although this addresses the risks to safety associated with commencing driving training in an actual vehicle, it lacks the realism of use of an actual vehicle, which can lead to inefficiencies in a driver training programme.

Racing of motor vehicles is an established sport that is conducted in dedicated venues and generally involves specialised very high performance vehicles. It is also an activity often undertaken in streets, sometimes legally, but sometimes illegally by generally younger drivers and particularly in respect of drag racing. Such drivers are often inexperienced racing drivers who wish to test their skills and their cars, which are typically highly powered, against each other. Clearly such street racing of cars by inexperienced drivers raises issues of lack of safety both to the participants and their cars and, if illegal racing is underway, to others who may inadvertently enter the location of a street race.

The present invention seeks to provide apparatus that may be set up for simulated driving of a motor vehicle for driver training, or for simulating a race, for example, a drag or a circuit race as an alternative to an actual race. The simulation involves both the driver of a vehicle and an actual vehicle as such (which may be that driver's own vehicle) under control of the driver at least in terms of speed in a virtual reality environment. The vehicle effectively remains stationary during the simulation and thus the above-mentioned safety issues surrounding driver training and real races in streets are addressed. It is believed that drivers will find the driving training or racing simulation to be an attractive alternative experience to actual driving or racing because it involves the driver participating in an actual vehicle, which may be the driver's own car.

DISCLOSURE OF INVENTION

According to the present invention there is provided apparatus for simulated driving of a motor vehicle, the motor vehicle having at least one drive wheel, the apparatus including a support for rotatably supporting the drive wheel of the motor vehicle such that the motor vehicle remains stationary whilst a driver thereof controls the rotational speed of its drive wheel, a computer containing simulation software for generating virtual scenic imagery for a driver of the vehicle, and a visual display system having a viewing screen arrangement, wherein the support, the computer and the visual display system are operably interconnected for the simulation software to generate virtual scenic imagery on the viewing screen arrangement of the visual display system for viewing by a driver whilst the driver controls the rotational speed of the drive wheel, the virtual scenic imagery having a progression which is dependent upon the rotational speed of the drive wheel, wherein the viewing screen arrangement of the visual display system, in use of a motor vehicle with the apparatus, includes a portion that extends across the front of and portions that extend respectively a distance along each side of the motor vehicle and wherein the simulation software and visual display system are such as to generate virtual front and side scenic imagery for the driver on the viewing screen arrangement.

The invention provides a safe and highly realistic environment for driver training or racing. This realism is achieved by the combined effect of three features, namely the driver "driving" an actual motor vehicle (which may be the driver's own vehicle) together with virtual scenic imagery on a viewing screen arrangement that effectively "surrounds" the driver (that is, it extends across the front and someway along the sides of the vehicle), and also together with the virtual scenic imagery progressively changing in real time in dependence upon the driver's "driving" of the stationary vehicle. Because the motor vehicle remains stationary whilst the driver "drives" it, issues of lack of safety as in driver training on public roads or street racing do not arise.

Preferably the visual display system includes three projectors, each for projecting virtual scenic imagery onto a respective one of the portions of the viewing screen arrangement to provide virtual scenic imagery that is integrated and spans about 180° relative to a driver in the vehicle. Preferably the screen arrangement is such that the virtual scenic imagery spans greater than 180° relative to the driver, for example, it may span any angle greater than 180° up to about 270° relative to the driver. This arrangement of the screen portions and projectors adds to the realism afforded by use of the apparatus either for driver training or racing. The simulation software for generating the virtual scenic imagery is set to produce the same result in virtual reality as would actually occur in a real life road situation.

The apparatus may be set up for driver training, that is the simulation software is such as to cater for driver training, in which case the apparatus may include a motor vehicle that is secured in position on the support to ensure it remains stationary whilst its drive wheel(s) rotate. Preferably the support is a chassis dynamometer. Thus apparatus that is effectively dedicated to driver training is provided, but which still utilizes an actual motor vehicle. Safety is further enhanced by the securement of the vehicle on the dynamometer.

The apparatus of the invention as described so far need not include means for a driver's manipulation of the steering of the vehicle to be sensed for influencing the training of a driver or the progress of a simulated race. Nevertheless, the apparatus still has use for driver training in that the driver can learn to co-ordinate use of some of the controls (for example, accelerator and brake, or clutch and gear changing for manual transmission cars) without the added burden of simultaneously learning steering. The apparatus also has use for race simulations that do not necessarily involve steering, for example, drag races. Preferably, however, the apparatus will include means for the steering of the motor vehicle to be involved either for driver training or for simulated racing.

Thus, preferably the apparatus includes a steering sensing arrangement for operable association with the vehicle steering for providing signals of steering actions by the driver which are inputted into the computer. For such steering input, the computer may be programmed for the steering action signals to influence the simulation software such that the virtual scenic imagery is deflected in synchronism with the steering actions of the driver.

Preferably the steering sensing arrangement includes a pair of transducers, each for transmitting a signal to a target and receiving a reflected signal from the target for providing an output electrical signal representative of the distance between the transducer and the target. The transducers of the pair are mounted relative to each other such that in use with a motor vehicle having a steerable wheel, each transducer transmits a signal to a target location on the steerable wheel, which target locations are on the same side of and are oppositely spaced from the centre of the steerable wheel. The output electrical signals of the two transducers are combined to derive an electrical signal representative of turning movements and the amounts thereof of the steering wheel about a generally vertical line through the centre of the wheel for measuring the steering actions of the driver of the motor vehicle. The signal representative of the steering movements and amounts (which is variable in accordance with steering variations) is inputted into the computer for the simulation software to deflect the virtual scenic imagery in synchronism with the steering movements of the driver thereby increasing the realism of the virtual reality environment that "surrounds" the driver on the viewing screen arrangement. Preferably the transducers are ultrasonic transducers and they are mounted such that the target locations on the steerable wheel are substantially equally spaced from the centre of the wheel along a generally horizontal diametrical line.

To ensure a higher level of safety, the apparatus preferably includes a securing mechanism for securing the motor vehicle in position, the securing mechanism including a vehicle engaging component that is engageable with the motor vehicle to ensure the motor vehicle remains stationary whilst its drive wheel(s) rotate on the support, which support is preferably via a chassis dynamometer.

Preferably a control system is provided that has a remote operating location, that is, an operating location that is spaced from the support for the drive wheel(s), for operating the securing mechanism to move the vehicle engaging component into engagement with the motor vehicle. A video monitoring system is also preferably provided for viewing the vehicle securing mechanism and providing a visual display thereof at the remote operating location of the control system, whereby a human operator can monitor the movement of the vehicle engaging component of the securing mechanism whilst operating the control system. This adds to the safety of operation of the apparatus as it provides direct feedback to the operator of the movement of the vehicle engaging component and ultimately of the proper securement of the vehicle.

The incorporation of the remotely controllable vehicle securing mechanism in the apparatus, besides providing for safety by ensuring that the vehicle remains stationary during a simulated driving session, additionally provides an advantage that a vehicle can be very quickly secured once its drive wheel(s) is/are on the support and can also be very quickly released after the conclusion of a simulated driving session. This allows for the apparatus, particularly when it is set up as a racing simulator, to have a high throughput of vehicles, thereby increasing the profitability of the apparatus compared to apparatus in which a vehicle is manually secured using hold down ropes, chains, bands or the like.

The control system for the vehicle securing mechanism may be principally an hydraulic, pneumatic or electrical system with the securing mechanism including at least one correspondingly operable actuator, for example, respectively either an hydraulic ram, a pneumatic ram or an electric motor. Typically the system may include electrical components, for example, position switches for manipulation by the operator, with either pneumatic or hydraulic components. Preferably the control system is principally a pneumatic system and the vehicle securing mechanism includes at least one pneumatically operable actuator for moving the component for engaging the vehicle.

Preferably the vehicle securing mechanism is such that the vehicle engaging component is movable along at least two generally orthogonal axes, for example towards or away from the support and transversely of a vehicle on the support. More preferably the securing mechanism provides for movement of the vehicle engaging component along three generally orthogonal axes, namely transversely of a vehicle on the support, generally longitudinally of a vehicle on the support and generally normal to the support towards and away from the vehicle. Thus, the mechanism may include an assembly of actuators, which assembly is remotely operable, via the control system, to move the vehicle engaging component in the generally orthogonal directions.

The vehicle engaging component of the securing mechanism needs to engage a structural part of the vehicle that is directly associated with the drive wheel. For example, for a vehicle having driven rigid axle rear wheels, this structural part may be the rear axle housing, or if the driven wheels are independently suspended it may be at a location directly associated with the knuckle assembly of the wheel hub, for example a bracket thereon which mounts a suspension component such as a spring or shock absorber. The reason for the vehicle engaging component to engage a structural part that is directly associated with the drive wheel is to increase safety because if another part of the vehicle is engaged, the "holding down" of the drive wheel on the support of the apparatus will be indirect, that is, the vehicle suspension will be interposed between the location where the vehicle engaging component of the securing mechanism engages the vehicle and the part of the vehicle which contacts the support, that is, the drive wheel. With such an indirect securement of the vehicle, wheel spin of the driven wheel on the support may occur and thereby adversely affect not only the stability of the securement of the vehicle but also the simulated driving session.

The vehicle engaging component of the securing mechanism may be such as to engage a vehicle without modification of the vehicle. For example, it may include a portion in the shape of a hook for hooking onto an appropriate part of the vehicle. More usually, however, the vehicle engaging component will be such as to engage a specially provided part on the vehicle, for example a bracket which is fixed to an appropriate part of the vehicle. Such a bracket may be for example in the shape of a hook which is mounted to a rear axle housing (as will be described hereinbelow), in which case the vehicle engaging component may be a pin (as will also be described hereinbelow). Another possibility is for the vehicle engaging component to include a roller for engaging the inside of the rim of the drive wheel. This may require the drive wheel(s) of the vehicle to have specially provided rim(s).

Given that the apparatus for simulated driving should ideally accommodate as wide a variety of vehicles as possible and to ensure the safe securement of all vehicles, it is preferred that any vehicle that is to use the apparatus have a special bracket or brackets fitted thereto beforehand which the vehicle engaging component of the securing mechanism engages. Such brackets will vary from vehicle type to vehicle type, but have a commonality in that the one form of vehicle engaging component is able to engage with them. Preferably the vehicle engaging component of the securing mechanism is a pin and any given bracket is such that it includes an aperture or opening for receiving the pin.

Preferably the apparatus according to the invention includes an electronic reader operably associated with the computer for remotely reading data from the motor vehicle as it approaches the apparatus for the computer to indicate to an operator that the vehicle is authorised and registered to use the apparatus.

The data from the motor vehicle may be contained in a bar-code device or a remotely readable electronic storage device (for example a "smart card") which is located in or on the motor vehicle. If a bar-code device is used, this may have an adhesive backing and be applied onto the vehicle's windscreen in a convenient location, and merely contain data authorising the vehicle's use of the apparatus. Alternatively a remotely readable electronic storage device may be provided in or on the vehicle which contains stored data about the vehicle for the computer to recognise that the vehicle is authorised to use the apparatus and other data for the computer to prepare the apparatus for that vehicle (for example, for a support that is a chassis dynamometer, to adjust the dynamometer to suit the wheel base of that vehicle) and/or for apparatus that is set up for racing simulations for the visual display system to display prior race performance information for that vehicle. Another possibility is that the. electronic reader may be arranged to read a bar-code device on the vehicle which provides authorisation data for the vehicle to use the apparatus and also to read a remotely readable electronic storage device on or in the vehicle which provides data for the computer to prepare the apparatus for that vehicle type, and for apparatus that is set up for racing simulations to display prior race performance information for the vehicle.

Preferably for apparatus that is set up for racing simulations the electronic reader includes a transmitter for transmitting data to an electronic storage device in or on a vehicle for storage of information of the vehicle's performance in a simulated race, whereby the electronic storage device stores data about the performance of the vehicle in a number of simulated races.

For a better understanding of the invention and to show how it may be carried into effect, preferred embodiments thereof will now be described, by way of non-limiting example only, with reference to the accompanying drawings.

BRIEF DESCRIPTION OF DRAWINGS

FIG. 8 is a perspective view showing components of a securing mechanism for a vehicle in apparatus as in FIG. 1.

FIG. 9 is an end view of the securing mechanism components of FIG. 8 showing their association with parts of the apparatus and a vehicle secured thereon.

DESCRIPTION OF PREFERRED EMBODIMENTS

Figure 1:
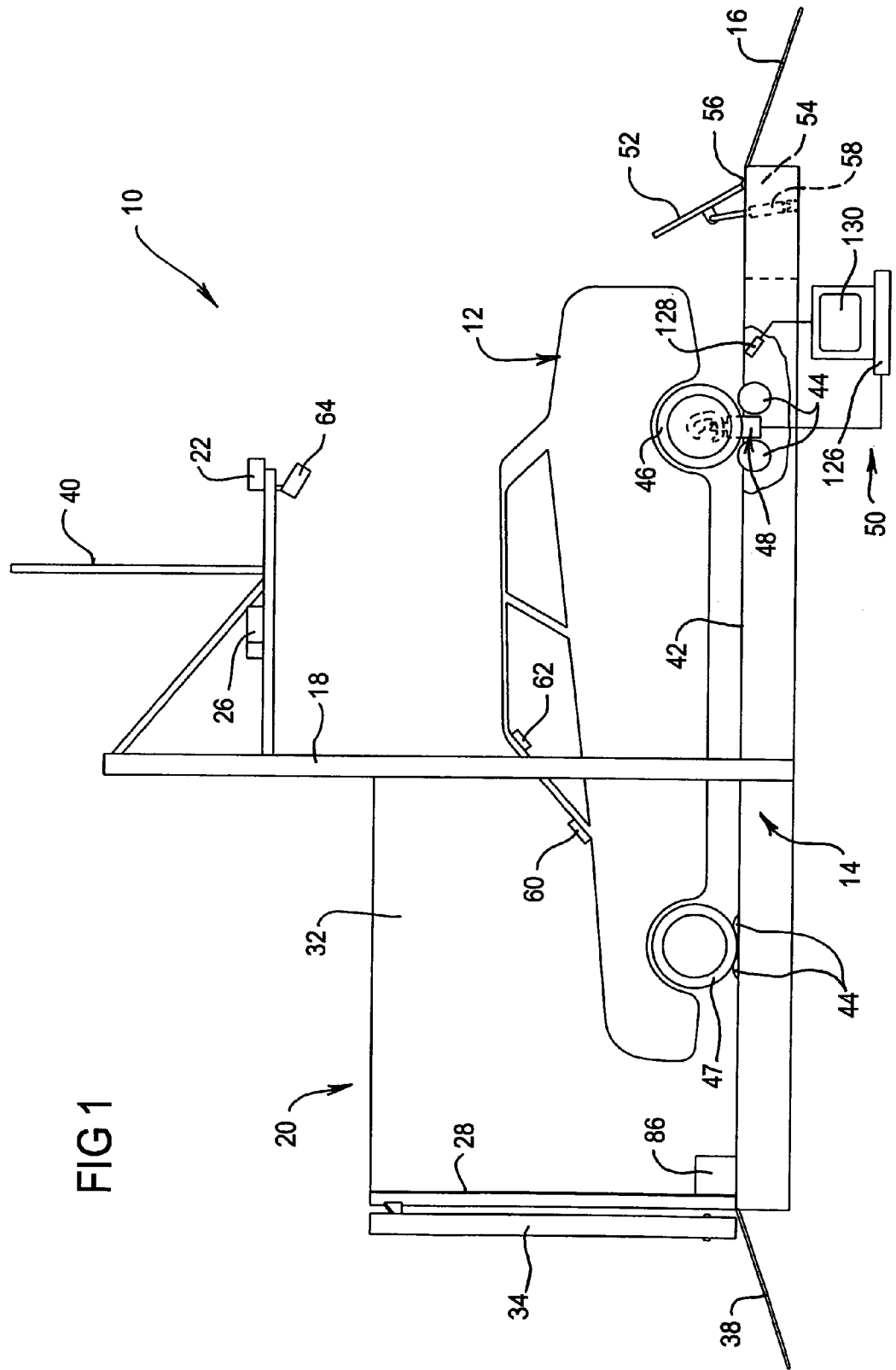
FIG. 1 is a schematic side elevation of apparatus for simulated driving according to an embodiment of the invention.

FIG. 1 shows apparatus 10 for simulated driving of a motor car 12 whilst the car 12 remains stationary as comprising a chassis dynamometer 14 onto which the car 12 may be driven via an entry ramp 16 of the dynamometer 14. The chassis dynamometer 14 has a frame 18 associated therewith which carries other components of the apparatus 10. These other components include some portions of a viewing screen arrangement 20 and projectors 22, 24, 26 of a visual display system. The viewing screen arrangement 20 includes a front screen portion 28 that extends across the front of the motor car 12 and side screen portions 30, 32 that extend, respectively, a distance along each side of the motor car 12 (the side screen portion 30 has been omitted from FIG. 1 for clarity). Each side screen portion 30 and 32 is angled at 120° from the front screen portion 28. There are three projectors 22, 24, 26 of the visual display system mounted on the frame 18, each for projecting virtual scenic imagery onto a respective screen portion, that is projector 22 projects images onto opposite front screen portion 28, projector 24 projects onto opposite side screen portion 32 and projector 26 (which is hidden in the FIG. 2 view) projects onto opposite side screen portion 30. The projectors 22, 24, 26 may be Panasonic DLP(™) Based Projectors No. PT-DS500E, which are provided with high quality wide-angle lenses for projecting onto the respective screen portions 28, 30 and 32.

Figure 4:
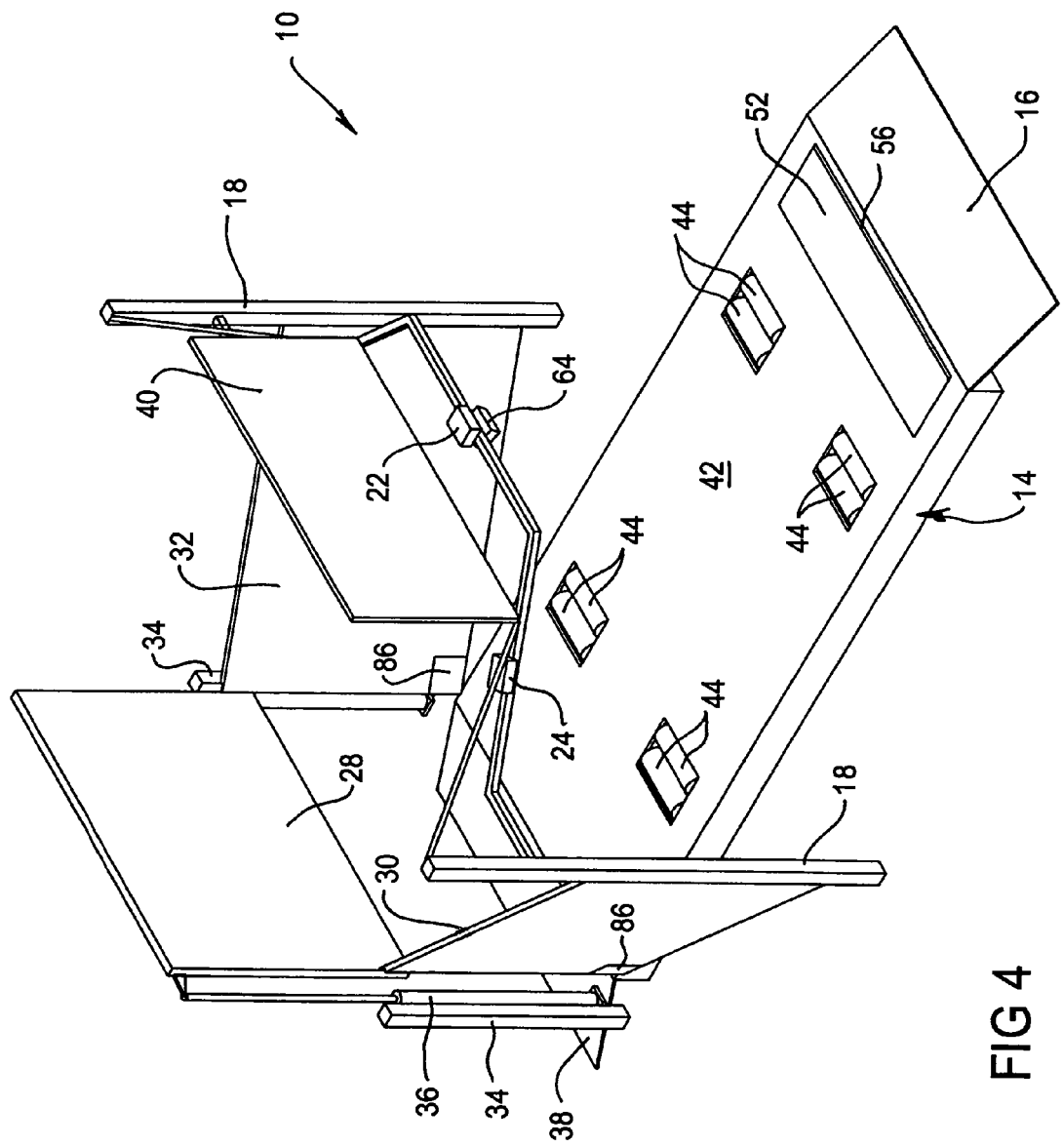
FIG. 4 illustrates the apparatus as in FIG. 3 with the front screen portion raised.

The front screen portion 28 is mounted relative to two side structural poles 34 via actuators 36 (for example, pneumatic or hydraulic piston and cylinder rams) which are operative to raise the front screen portion 28 (see FIG. 4) relative to the side screen portions 30 and 32 such that a car 12 and its driver, after having participated in a simulated driving session, can exit the apparatus 10 via an exit ramp 38 of the chassis dynamometer 14. The front screen portion 28 and actuators 36 are associated with the structural poles 34 such that the front screen portion 28, when it is to be raised, is first moved slightly away (for example, by a few mm only) from the adjacent edges of the side screen portions 30 and 32 such that as it is raised by the actuators 36, there is clearance between it and the adjacent edges of the side screen portions 30 and 32.

For apparatus 10 for simulated racing, the frame 18 may also have mounted thereon another, larger, visual display screen 40 for an audience to view the simulated race.

The chassis dynamometer 14 has a platform 42 and includes supports in the form of pairs of rollers 44 for supporting and rotatably engaging the rear wheels 46, and front wheels 47 of the car 12, as is known for chassis dynamometers. The rear wheels 46 of car 12 are the driven wheels and the front wheels 47 are the steered wheels. Thus the rollers 44 provide for the car 12 to remain stationery whilst a driver thereof manipulates the car's controls, for example the gear change (if not automatic) and accelerator, to rotate the drive wheels 46 of the car 12 at speed (the apparatus 10 could be set-up for the drive wheels of a vehicle to be either the front or rear or both the front and rear pairs of the wheels). Rotation of the drive wheels 46 correspondingly rotates the associated pairs of rollers 44 via which various performance parameters of the car 12, such as acceleration, speed (RPM), horsepower, torque and time to travel over a set distance, can be measured. Measurement of such performance parameters may include varying the loads that are applied to the wheels 46 of the car 12 via the pairs of rollers 44, as is known for chassis dynamometers. Suitable chassis dynamometers, which are adjustable to accommodate different vehicles having different wheelbases (which adjustability is not illustrated in the figures) are obtainable from DYNO DYNAMICS of Industry Court, Lilydale, Victoria 3140, Australia.

The chassis dynamometer 14 also includes a securing mechanism 48 (which is only schematically illustrated in FIG. 1 and is located between each of the rollers of the rear pairs of rollers 44) for securing the car 12 to the dynamometer 12 once the car 12 is positioned on the pairs of rollers 44. Securing mechanism 48 and its operation will be described in more detail hereinbelow with reference to FIGS. 8 and 9, however in broad terms it is associated with a remotely operable control system (schematically represented by reference 50 in FIG. 1) and adjustable thereby to allow it to secure in place on the rollers 44 various different types and sizes of vehicles. It includes componentry for engaging a vehicle, such as a car 12, to hold the vehicle in place. The securing mechanism 48 is a safety feature that ensures the car 12 remains stationary whilst its wheels 46 are driven at speed on the rollers 44.

The chassis dynamometer 14 furthermore includes an arrangement for diverting exhaust gases from the car 12 away from the immediate vicinity of the apparatus 10. This arrangement comprises a deflector plate 52 for deflecting exhaust gases from the car 12 into an extraction duct 54. The duct 54 may include an extraction fan or other means (not shown in FIG. 1) for drawing the exhaust gases into the duct 54. The deflector plate 52 is hinged to the platform 42 of the dynamometer 14 at 56 and provides a cover for the duct 54 when the apparatus 10 is not in use. Deflector plate 52 is pivotal about its hinge 56 via an actuator 58 (which may be for example pneumatic or hydraulic) which is pivotally attached between the deflector plate 52 and the dynamometer 14.

A car 12 which is to be used for driving instruction or to participate in a simulated drag or circuit race may include a remotely readable device, such as a bar code 60 and/or an electronic device 62, for example a "smart card" or other electronic tag-like device, which contains data about the car 12, the purpose and functioning of which will be described in more detail hereinbelow. A reader/transmitter 64 is mounted on frame 18 (near projector 22) for operation/co-operation with bar code 60 and/or electronic device 62.

Figure 7:
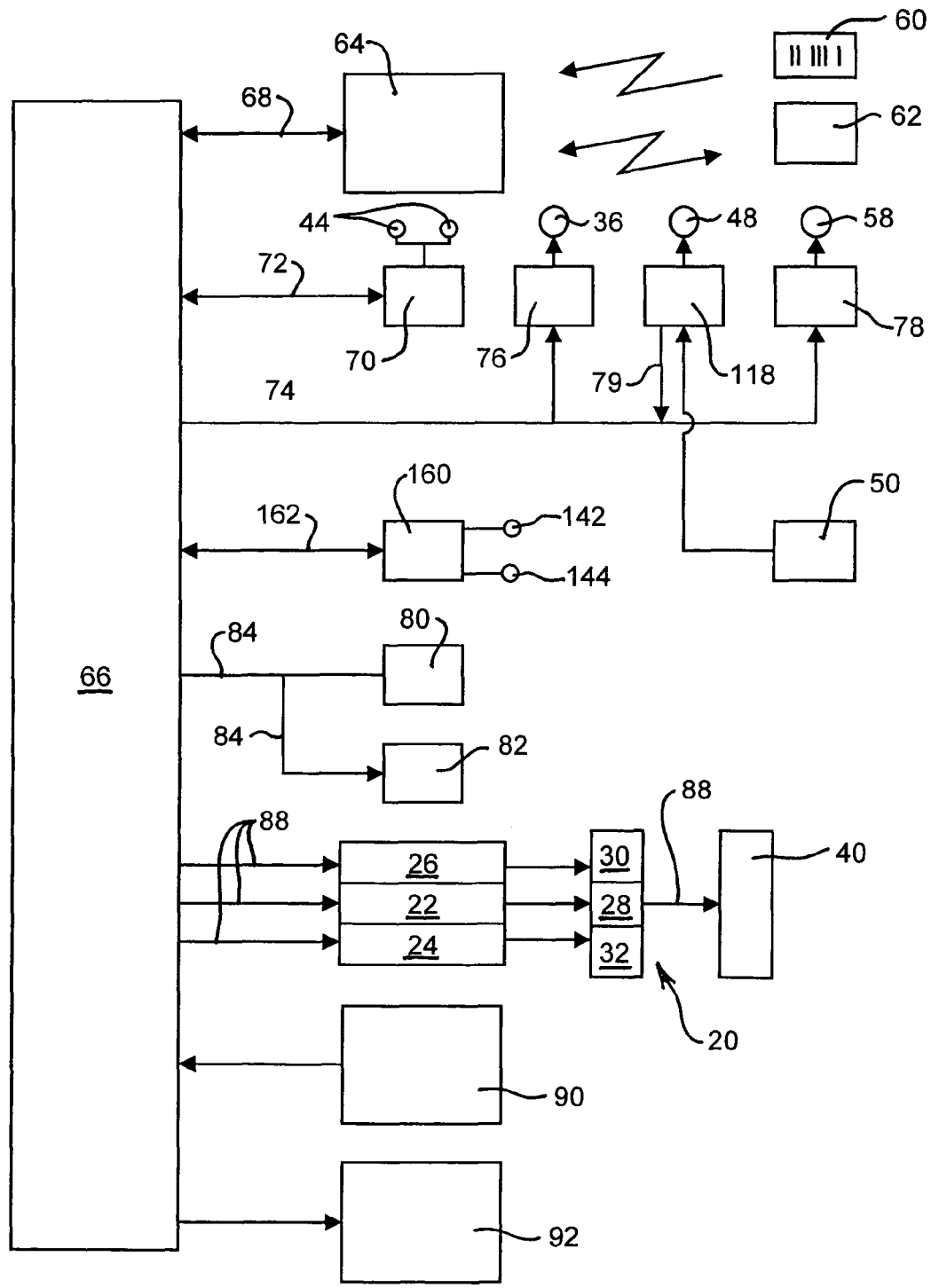
FIG. 7 is a block diagram showing operable associations of control and display components of apparatus for simulated driving according to an embodiment of the invention.

With reference to FIG. 7, the apparatus 10 for simulated driving includes a computer 66 which controls the various components of the apparatus 10 and contains the driving simulation software. The reader 64 (which may be combined with a transmitter) for reading the remotely readable bar code device 60 and/or electronic device 62 included in or on the car 12 is connected to computer 66 via a data link 68. Relevant data about car 12 is acquired by reader 64 from bar code 60 or electronic device 62 and inputted to the computer 66 over data link 68. A transmitter is preferably combined with the reader 64 for transmitting data from the computer 66 to the device 62 to update information about the car 12 that is stored by the electronic device 62. Such transmitted information may be, for example, data of the car's performance in a simulated ¼ mile drag race.

Each pair of rollers 44 of the chassis dynamometer 14 is associated with a brake unit 70 (also known as a "retarder"—only one of which is illustrated in the FIG. 7 schematic) and brake units 70 are operatively connected to computer 66 as indicated by data link 72 (as is known, an analogue to digital interface would be associated with each brake unit 70). There is data flow from computer 66 to brake units 70 to vary loads applied to the drive wheels 46 of a car 12 via the pairs of rollers 44 and also data feed back from the brake units 70 to the computer 66 from which relevant performance parameters of the car 12 are derivable, as is known for chassis dynamometers.

The computer 66 also controls operation of the actuators 36 for raising the front screen portion 28 and the actuator 58 for deflector plate 52. Thus a signal line 74 from computer 66 is connected to respective converter/drivers 76 and 78 for operating respectively, the rams 36 for raising the front screen portion 28, and the actuator 58 for the deflector plate 52. The securing mechanism 48, which includes at least one actuator 118, is operated by the remotely operable control system 50. Note that reference 118 in FIG. 7 only schematically represents the actuator requirements for securing mechanism 48 in that multiple actuators may be involved to provide a range of movements, for example along three orthogonal axes, for the securing mechanism 48. A safety interlock signal over line 79 from mechanism 48-76 may be connected to computer 66 (for example via signal line 74) to prevent operation of the dynamometer 14 until the vehicle 12 has been secured thereon. Additionally, computer 66 controls the on-off operation of a blower fan 80 and an exhaust gas extraction fan 82 in duct 54 via a signal line 84. Blower fan 80 (not illustrated in the other figures) is provided to provide a cooling air flow to the front of the car 12 through apertures 86 in side screen portions 30 and 32 (see, for example, FIGS. 1 and 2).

Computer 66 also operates the three projectors 22, 24, 26 of the visual display system for viewing screen arrangement 20 and, if provided, screen 40, as indicated by data links 88. The computer 66 will also typically include a data entry facility, such as a key board or touch screen 90 and an output device such as a printer 92.

Figure 2:
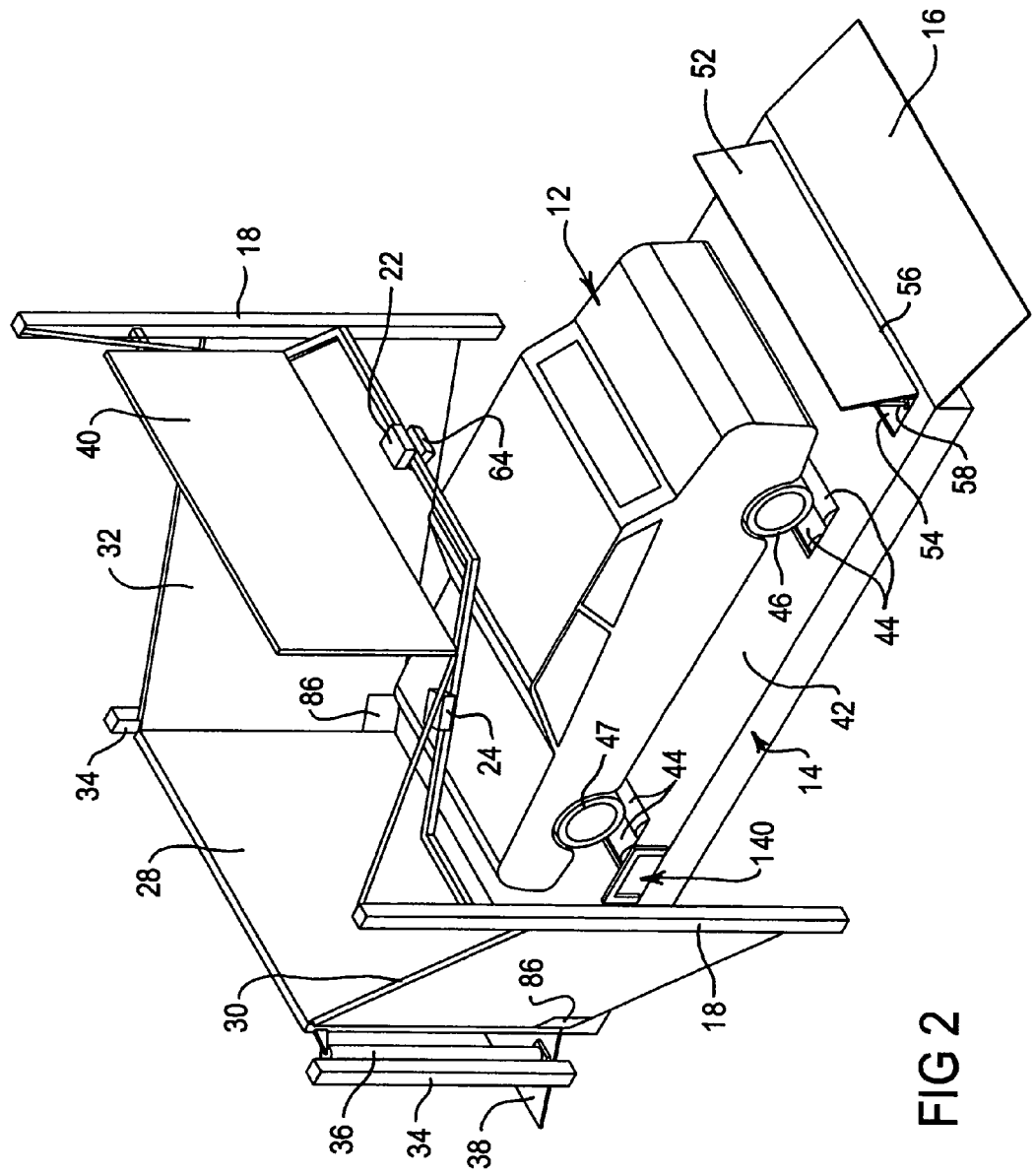
FIG. 2 is a schematic isometric view of the apparatus of FIG. 1 that includes a motor car.
Figure 5:
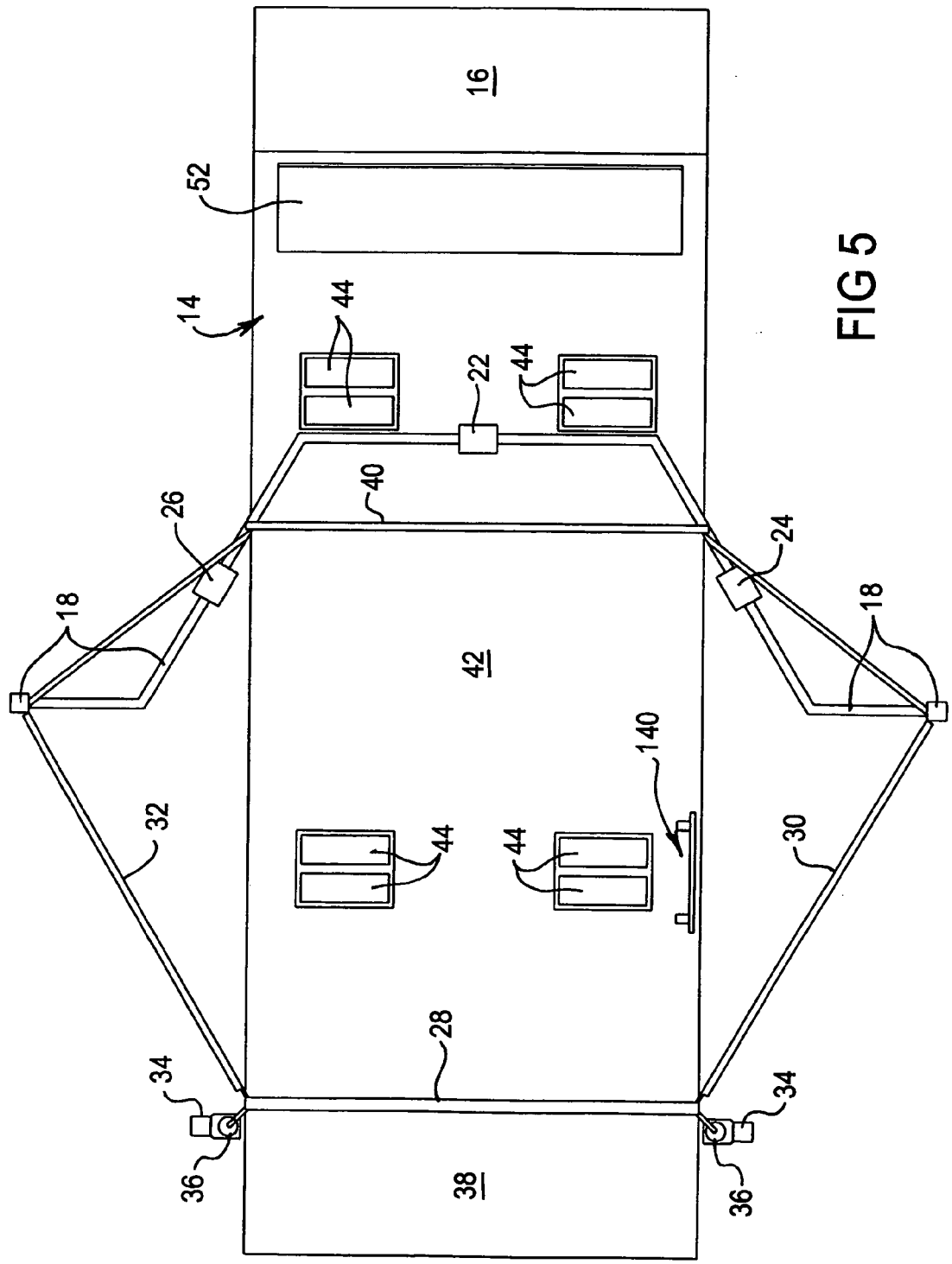
FIG. 5 is a plan view of the apparatus of FIG. 1 without a motor vehicle.
Figure 6:
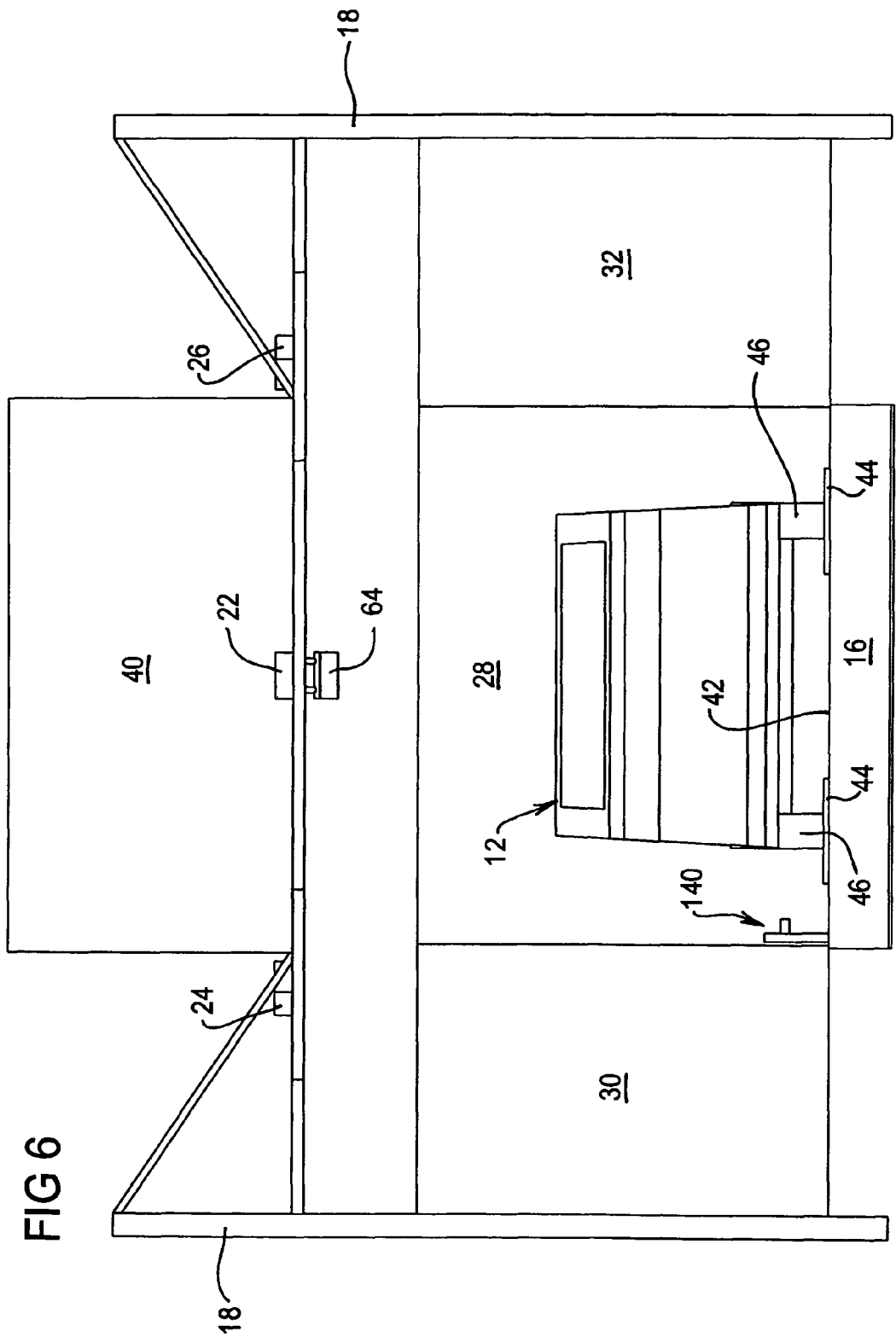
FIG. 6 is a front elevation of the apparatus of FIG. 1 showing a motor car in the apparatus.

The apparatus 10 also preferably includes a steering sensing arrangement 140, for example a pair of transducers 142, 144, for measuring steering actions of a driver of a motor vehicle on the apparatus 10. The steering sensing arrangement 140 is preferably located on the dynamometer 14 adjacent a steered wheel 47 of the motor car 12, for example in FIG. 2 it is shown adjacent the left front wheel 47 of the motor car 12 (note that the steering sensing arrangement 140 is shown in FIGS. 2, 5 and 6, but omitted from FIGS. 1, 3 and 4 for clarity).

Figure 10:
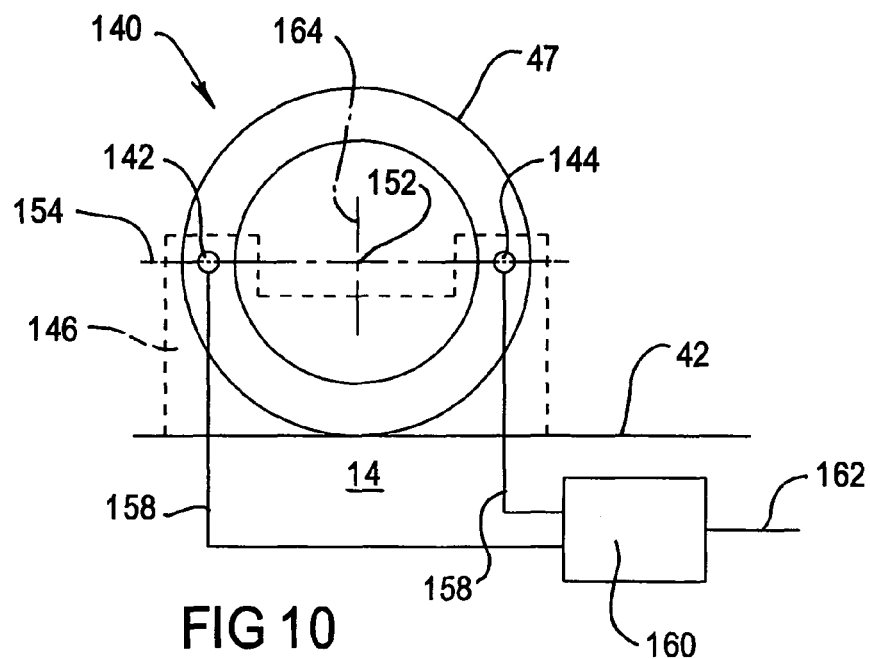
FIG. 10 is a schematic side view of a steering sensing arrangement of transducers for measuring steering actions of a driver of a motor vehicle for use in apparatus as in FIG. 1.
Figure 11:
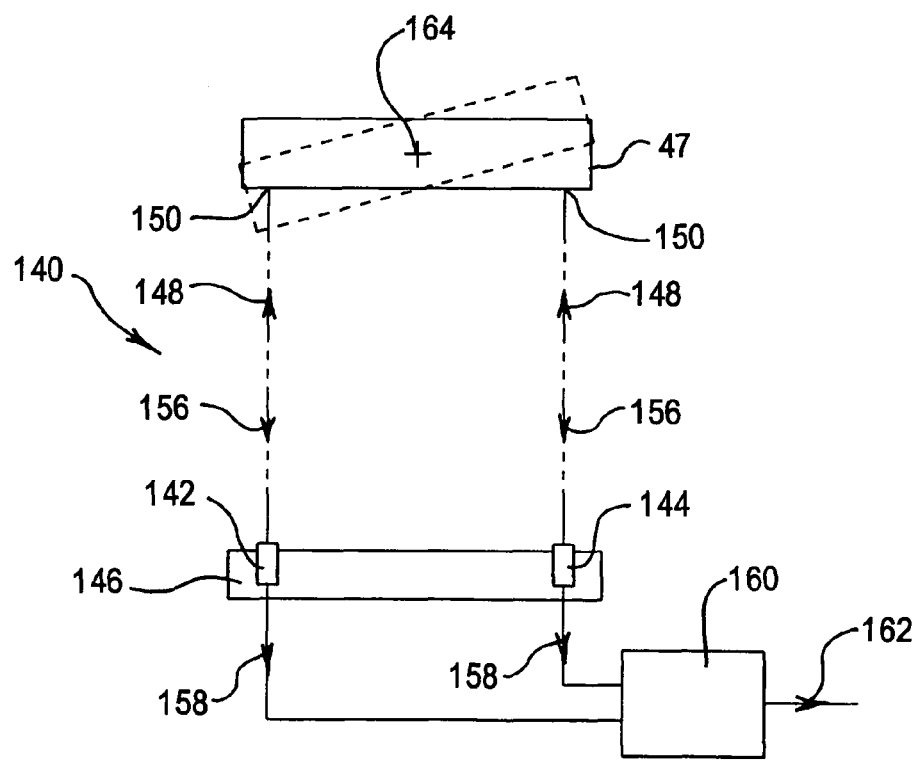
FIG. 11 is a schematic plan view of the steering sensing arrangement of FIG. 10.

With reference to FIGS. 10 and 11, the steering sensing arrangement 140 includes two ultrasonic transducers 142, 144 and a support 146 therefore. The support 146 is located on platform 42 of dynamometer 14 such that the two spaced transducers 142, 144 which it mounts, will each transmit an ultrasonic signal 148 to a target location 150 on the steerable wheel 47. The target locations 150 are on the same side of steerable wheel 47 and are oppositely spaced from the centre 152 of the wheel 47, preferably they are substantially equally spaced from the centre 152 along a generally horizontal diametrical line 154. Reflected ultrasonic signals 156 from the target locations 150 are received by the transducers 142, 144 for the transducers to each provide an output electrical signal 158 representative of the distance between the transducer 142 or 144 and its target location 150 on the steerable wheel 47. The output electrical signals 158 of the two transducers 142 and 144 are suitably amplified and combined, for example subtracted, via appropriate electronic circuitry 160 to derive an electrical signal as indicated by the arrowhead on signal line 162 representative of the magnitude of turning movements of the steered wheel 47 about a generally vertical line 164 through the centre axis 152 of the wheel 47 (and thus of the steering movements of the driver) which is inputted to the computer 66. It can be seen from FIG. 11 that the above described and illustrated positioning of the two ultrasonic transducers 142, 144 relative to the steerable wheel 47, on subtraction of the two electrical output signals 158, provides an output signal 162 representative of only magnitude changes in the rotation of wheel 47 about the vertical axis 164. By setting the transducers 142, 144 at a suitable distance from the tyre wall of wheel 47, the target locations 150 can be made such that an average of the tyre axial portion is measured with a minimum of interference from tyre runout, dirt, raised logos etc on the tyre surface. A motor car 12 is allowed some lateral motion whilst being driven when supported on the rollers 44 and by using the two transducers 142, 144, such lateral motion is also compensated for in the output electrical signal 162. Final filtering of the signal 162 to remove any remaining jitter or other noise is done in software in computer 66. The ultrasonic transducers 142, 144 may be 'BANNER' brand model UGUAGE transducers. Other types of transducers may alternatively be used, for example laser or radio wave (eg. microwave) based transducers.

FIG. 7 illustrates the connection of the transducers 142, 144 and electronic processing circuitry 160 to the computer 66. The signal on line 162 of steering movements is utilized by the simulation software to deflect the virtual scenic imagery on viewing screen arrangement 20 (that is, the imagery on all of screen portions 28, 30 and 32) in synchronism with the steering movements of the driver thereby increasing the realism of the "surrounding" virtual reality environment.

The mounting of the transducers 142, 144 on support 146 is preferably adjustable such that the spacing between the transducers 142, 144 can be altered to suit differently sized steerable wheels 47 as may be required for some motor vehicles, also the height of the transducers 142, 144 is adjustable relative to the platform 42 of dynamometer 14 for the same reason. Also for apparatus 10 that includes a steering sensing arrangement 140, it is preferred that the steerable wheels 47 not be supported on the rollers 44 because this detracts from the "natural feel" of the steering. Thus a platform or swivel plate (not shown) may be placed over the rollers 44 on which the steerable wheels 47 would otherwise rest to provide a flat surface for the steerable wheels 47. Otherwise a chassis dynamometer 14 that provides rollers 44 only for the rear driven wheels 46 of a front wheel steering motor vehicle may be used.

A steering sensing arrangement 140 as described which remotely senses steering actions and thus requires only minimal or no human operator involvement to set it ready for a particular vehicle adds to the efficiency of operation of the apparatus 10 as the turn around time for each vehicle is minimised.

The securing mechanism 48 and its operation will now be described with reference to FIGS. 8 and 9. FIGS. 8 and 9 illustrate only half of the mechanism 48 for securing the car 12 via its rear axle housing 94 adjacent its left side rear wheel 46 (for clarity, FIG. 8 omits the car's rear wheel 46 and the pair of rollers 44 on which the wheel 46 rests). A similar arrangement to that which is illustrated is also provided for the other side of the car 12. The mechanism 48 requires brackets, such as hooks 96 (only one of which is illustrated) to be permanently attached, for example by welding, to the rear axle housing 94 of the car 12. The hooks 96 are open towards the front of car 12 for safety. The securing mechanism 48 includes a load beam 98 having a pivot 100 located at each end (only one of which is shown) via which the load beam 98 is pivotally attached to opposite structural side beams 102 of the dynamometer 14. (FIG. 9 shows only one side beam 102). A curved bracket arm 104 is attached to load beam 98 near its centre and an actuator 106 (for example a pneumatic or hydraulic piston/cylinder ram) is pivotally attached to the bracket arm 104 and to the chassis dynamometer 14 for pivoting the load beam 98 (bracket arm 104 and actuator 106 have been omitted from FIG. 9 for clarity). Arrow B on FIG. 8 indicates the pivotal movement of the load beam 98 via actuation of actuator 106. The pairs of rollers 44 of the dynamometer have respective axles 108 which are mounted in bearings 110, which bearings 110 are mounted on respective structural side beams 102. Not shown is the mounting of axles 108 extending from the other side of each roller 44 in bearings such as 110 mounted to structural beams of the dynamometer located between the side beams 102. The load beam 98 is pivotally attached to side beams 104 such that it is located between and below a pair of rollers 44. The load beam 98 spans the width of the dynamometer 14 between its side beams 102.

The top of the load beam 98 includes a slideway 112 which captively holds a block 114 for sliding movement along the load beam 98. The block 114 is connected to an actuator 116 (for example a pneumatic or hydraulic piston and cylinder ram) which is attached to the load beam 98 adjacent to pivot 100 and which is operable to move the block 114 to and fro along load beam 98 as indicated by arrow C. Block 114 carries another actuator 118 (for example a pneumatic or hydraulic piston and cylinder ram) which is moveable upwardly and downwardly relative to block 114 as indicated by arrow D. Block 114 includes guide rods 120 for guiding and providing lateral stability for actuator 118. For clarity, the means for actuating the actuators 116 and 118 (for example pneumatic or hydraulic hose connections from a suitable supply—which are components of the remotely operable control system 50) have been omitted from FIGS. 8 and 9, and likewise for the actuators 36 and 58 of FIGS. 1-6.

Attached to the top of the actuator 118 in a mounting 122 is a pin 124 which extends generally horizontally beyond the actuator 118. Also, another actuator 116, block 114, actuator 118 and pin 124 arrangement (not shown) is located on load beam 98 adjacent its other end.

The securing mechanism 48 (comprising a vehicle engaging component, namely pin 124, and actuators 106, 116 and 118 together with load beam 98—as represented by reference 118 on FIG. 7) is remotely operable by a control system 50 (schematically represented by reference 50 on FIGS. 1 and 7 but not shown on the other Figs). The control system 50 comprises operating switches in an operator's console or booth 126 (schematically shown only in FIG. 1) located for example beside the chassis dynamometer 14 for controlling the operation of the actuators 106, 116 and 118. The control switches may be "joystick" type switches for operating a pneumatic system for powering the actuators 106, 116, 118. A "joystick" type switch may be provided for operating respectively each actuator of each side of the securing mechanism 48. The dynamometer 14 also includes a video monitoring system (schematically illustrated only in FIG. 1) comprising video cameras 128 located to view the operation of the vehicle securing mechanism 48 and display the movement of at least pins 124 and possibly also actuators 106, 116, 118 on a video screen 130 located in the operator's console or booth 126 for an operator to view such movement as she/he operates the switches of the control system 50 to move the pins 124 as desired.

By appropriate operation of actuators 106, 116 and 118 via the control system 50 in directions B, C and D, the pin 124 is positionable to engage in front of hook 96 as shown in FIG. 9 (and similarly for the opposite actuators on load beam 98). Actuator 118 is furthermore operable via the control system to "pull down" on the hook 96 and thereby secure the car 12, via its rear axle housing 94, in position on the rollers 44 of dynamometer 14. The pivotal movement B of load beam 98 via operation of actuator 106 by the control system 50 accommodates for tolerances in the engagement positions of pins 124 with hooks 96 and for different motor vehicles. Different "pull down" forces may be applied by the actuators 118 to vary the loading of wheels 46 on the pairs of rollers 44. Skilled persons will understand that the securing mechanism 48 and hooks 96 must have adequate structural integrity to accommodate the loading and forces to which they will be subjected.

In a modification of the mechanism 48, the actuator 106 providing the controlled generally longitudinal movement B may be omitted and a pre-tensioned springs or the like which generally centralises each pin 124 longitudinally between each roller of a pair of rollers 44 may be provided in its place. This does not compromise the utility of the mechanism 48 for engaging a motor car 12 and has the advantage of allowing some movement of the motor car 12 forwards and backwards on the rollers 44 as it is being "driven" thereon, which adds to the realism of a simulated driving session on the apparatus 10.

It is within the scope of the invention that an alternative securing mechanism may be provided which does not require attachment of brackets such as the hooks 96 to a vehicle, although it is considered that usually a vehicle which is to use the apparatus of the invention will have brackets fitted thereto for the pins 124 to engage. Thus, it is envisaged that a suitable hook arrangement may be associated with suitable actuators providing for the range of movements B, C and D such that the hook arrangement can be moved to hook onto an appropriate structural component of a vehicle, for example the rear axle housings as for the mechanism 48. As an example of such an alternative, the pins 124 of securing mechanism 48 of FIGS. 8 and 9 could be replaced with suitably shaped and orientated hooks to hook onto the rear axle housings 94, and although this may require some modifications of the actuator assemblies 106-116-114-118 to fit within the available space, such modifications may be made by a person who is mechanically skilled. In this alternative, the hooks would be orientated with their openings to the rear of the vehicle for safety, that is such that the "forwards" driving of the wheels 46 on rollers 44 would be in the opposite direction to the hook openings.

Operation of the apparatus 10 for simulated driving will now be described.

For apparatus 10 for simulated racing (hereinafter referred to as racing simulator 10) the driver of a car 12 wishing to participate in a simulated race, for example a ¼ mile drag race, must first purchase a bar-code device 60 and/or remotely readable electronic device 62 (hereinafter termed a "drag-tag"). If only a bar-code device 60 is utilized, this will contain data that authorizes the particular car 12 to use the racing simulator 10. If a drag-tag 62 is utilized, this will have relevant data about the car 12 entered and stored therein together with authorisation data for that particular car 12. At the same time at the purchase point, suitable brackets such as the hooks 96 would be attached to the car 12 if this has not previously been done. The "drag-tag" 62 may be validated for a specific number of drag races and be available at one or more outlets that may or may not be remotely located from a racing simulator 10. Alternatively a number of bar-code devices 60, each providing authorisation for the race, may be purchased. For example, it is considered that several racing simulators 10 may be provided throughout a region and able to be operated by barcode devices 60 or a "drag-tag" 62 obtained and validated at a single outlet. The driver must then locate a bar-code device 60 or the "drag-tag" 62 in a suitable location in or on the car 12 such that it will be read by the reader/transmitter 64 of a racing simulator 10 as the car 12 approaches the chassis dynamometer 14 as it is being driven thereon.

Figure 3:
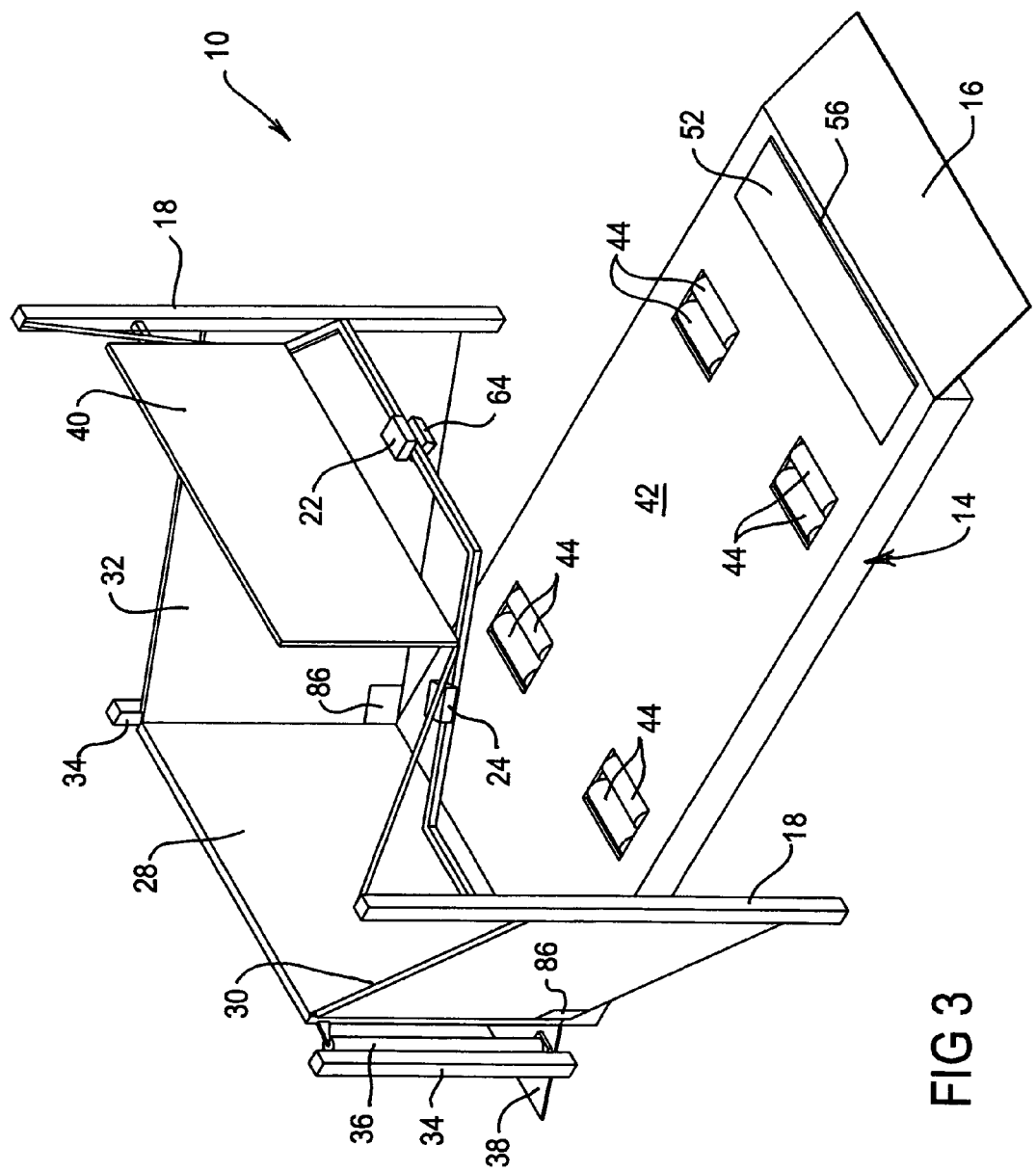
FIG. 3 illustrates the apparatus as in FIG. 2 without the motor car.

Prior to the car 12 being driven onto the chassis dynamometer 14, the racing simulator 10 will be set up as shown by FIG. 3, that is, the front screen portion 28 will be in its lowered position, the securing mechanism 48 (not shown in FIG. 3) will be in an inoperative position and the deflector plate 52 will be closed. Also the pairs of rollers 44 will be braked to effectively lock them to allow car 12 to be driven onto them. Plates (not shown) that can be raised or lowered by an operator may be located between each roller 44 of each pair of rollers 44. When such plates are in their raised position, a motor car 12 can be readily driven into position on the dynamometer 14 without having to go over the 'humps' of the rollers 44. When the car 12 is correctly positioned, the plates can be lowered to bring its wheels 46, 47 into contact with the rollers 44 for the car 12 to be supported thereon. As the car 12 approaches the chassis dynamometer 14, its bar code device 60 or drag tag 62 is read by reader 64 for computer 66 to initiate adjustment of the dynamometer 14 to space the pairs of rollers 44 to suit the wheelbase of the car 12. Once the car 12 has been driven onto the pairs of rollers 44, if the car 12 is authorized for a race in the racing simulator 10, the operator in console 126 operates the control system 50 for the mechanism 48 to secure the car 12 in position. An option for the securing mechanism 48 is to provide a facility (not shown) near the entry ramp 16 for a driver of the car 12 to pre-select the hold-down pressure that will be applied by the actuators 118 of the securing mechanism 48. The hold-down pressure may be between about 2 to 8 bar. This gives the driver the option of selecting a greater pressure to give better traction but at the expense of available horsepower, as opposed to less pressure for greater available horsepower but a higher likelihood of wheel spin on the rollers 44. The computer 66 is then further initiated to set up the racing simulator 10 for the car 12. This may be in accordance with data about the car 12 that has been acquired from a "drag-tag" 62 via the reader/transmitter 64. Thus the computer 66 transmits appropriate signals on signal line 74 for actuator 58 to raise the deflector plate 52. The brake unit(s) 70 may also be conditioned via a signal over line 72 to impose a certain load via roller pairs 44 to suit the car 12 for the race simulation. For example, a certain "rolling resistance" may be required. The racing simulator 10 is now conditioned or set up for the simulated drag race to begin.

Computer 66 includes simulation software, for example for a ¼ mile drag race, which is automatically initiated as soon as the racing simulator 10 is set up for the drag race to begin. This software via the visual display system displays a lighting sequence on front screen portion 28 for the driver to start, as is known for real ¼ mile drag racing. On receiving the final start light, the driver presses on the accelerator of car 12 as though commencing a real race and the virtual scenic imagery display on screen arrangement 20 progresses in dependence upon the speed of the wheels 46 via feedback from the pairs of rollers 44. The simulation software is such as to drive the computer's image generator and thus the projectors 22, 24, 26 to display on the viewing screen arrangement 20 realistic three-dimensional virtual front (on front screen portion 28) and side (on side screen portions 30 and 32) scenic imagery of front-on and passing scenery as though the driver was racing the car 12, which virtual scenic imagery has a progression that is synchronised to the speed of the drive wheels 46 of car 12 as measured via the pairs of rollers 46. Thus all speed changes via acceleration, gear changes and braking are sensed and fed to computer 66 to control the progress of the virtual scenic imagery. The driver of the car 12, with his/her eyes focussed on the front screen portion 28 of the viewing screen arrangement 20 (which may be quite large, for example each screen portion may be 4.5 m×3.375 m to render greater realism) experiences the sensation of participating in a real drag race in his/her own car 12 whilst the car 12 remains stationary and is secured in position on the chassis dynamometer 14 by securing mechanism 48.

Simultaneously with commencement of the simulated race, the computer 66 initiates operation of the blower fan 80, the outlets 86 for which are located for air to blow onto the front of the car 12 to cool its engine for the duration of the simulated race. The extraction fan 82 (see FIG. 4) in the exhaust gas extraction duct 54 is also switched on at the same time as the blower fan 80 by the computer 66.

At the end of the simulated ¼ mile drag race, the time taken for the driver/car 12 combination to complete the race is displayed on front screen portion 28 and transmitted by reader/transmitter 64 to the "drag-tag" 62 to be stored by the "drag-tag" 62. Thus a "drag-tag" 62 can store data of a race number and the time for that race such that the driver can have a history of his/her times over a series of simulated races displayed on the front screen portion 28 at the commencement and end of a simulated drag race.

After a short display of the driver/car 12 race time on front screen portion 28, the operator operates the control system 50 to release the securing mechanism 48, and the computer 66 initiates closure of the deflector plate 52, raising of the front screen portion 28 and locking of the pairs of rollers 44 whereupon the driver is able to drive car 12 forwardly off the chassis dynamometer 14 over its exit ramp 38. The race simulator 10 is thus ready to receive another vehicle via its entry ramp 16.

The apparatus 10 may also be used for simulated circuit races and this will differ from the above description about simulated drag racing in that additionally the steering sensing arrangement 140 is operated to input the driver's steering actions during a simulated circuit race into the computer 66 for the simulation software to drive the computer's image generator and thus the projectors 22, 24, 26 to laterally deflect the virtual scenic imagery on the viewing screen arrangement 20 in synchronism with the steering actions of the driver. That is, the virtual scenic imagery progresses in real time in synchronism with both the power applied by the driver to the drive wheels 46 and with the driver's steering actions. Such progression involves a virtual road ahead seemingly moving towards and under the car to simulate forwards speed of the car and the virtual road or other imagery deflecting laterally to simulate the car turning. The screen arrangement 20 effectively provides a "surround" triple-screen display enclosure which presents a field of view for the driver in excess of 200 degrees horizontally, which in combination with multi-perspective, high resolution travelling imagery (created by the simulation software and visual display system) creates for the driver of car 12 an illusion of his/her own personal virtual reality environment, which continually flows through changing perspectives generated by the driver's own actions of application of power to the car 12 and steering it.

For the apparatus 10 to be used for circuit racing, the steered wheels 47 of the car 12 are preferably not supported by the rollers 44, instead they may be supported on a support plate between or over the rollers 44 (as mentioned above). Alternatively the dynamometer 14 may be of a type that includes rollers 44 for supporting only the drive wheels 46 of a car 12 and not its steered wheels 47.

The apparatus 10 may be used for driver training instead of circuit racing (in which case the simulation software need not provide the start procedures for drag or circuit racing as described above). Apparatus 10 may also be provided for driver training which already has a car 12 secured in position on the dynamometer 14, thus eliminating the need for a learner driver to have his/her own vehicle and rendering unnecessary the use of a bar code device 60 or 'drag-tag' 62. Generally, apparatus 10 that is for driver training will be set up to accommodate rear wheel drive vehicles with front wheel steering.

Apparatus 10 set-ups may be provided side by side to accommodate two vehicles effectively in side-by-side stations, and can include race simulation software in computer 66 for each station that allows one driver/vehicle combination to compete against the other driver/vehicle combination instead of, or in addition to, a single driver/vehicle combination seeking to improve upon previous race times. The invention includes simulated driving apparatus which provides more than two side-by-side stations.

The apparatus 10 preferably additionally includes sound and lighting devices (not shown) for generating sounds and lighting effects onto a car 12 during a simulated driving session to increase the sense of realism of the simulated driving session. Such sound and lighting effects are preferably co-ordinated with effects on the virtual scenic imagery on the screen arrangement 20, that is, for example for night driving, street lighting effects can be provided, or for a car 12 that enters a simulated skid a sound of squealing tyres can be generated. It is well within the skill of a programmer to provide simulation software for driving such sound and lighting devices in synchronism with the progression of the virtual scenic imagery.

The apparatus 10 also allows for advertising sponsorships by way of the simulation software including programs for displaying appropriate advertising signs etc. on the viewing screen arrangement 20 before during or after a simulated driving session. For example, during a simulated race, the advertisements could appear as road side signs that the driver passes.

Various modifications within the scope of the invention, other than those already described, may be made in respect of the apparatus 10 as described hereinbefore. For example, a simulated race could be other than a ¼ mile drag race or a circuit race, for example it could be for simulated rally driving. Also the simulation software is preferably such that operator input to the computer 66 via data entry facility 90 is possible to present the driver with unexpected driving situations, for example to put the vehicle into a simulated skid, which the driver is expected to recover from.

The dynamometer may include less than the four pairs of rollers 44, for example it may include only two pairs of rollers to rotatably support the drive wheels of a vehicle, be they the front or rear pair of wheels. It is also within the scope of the invention to provide a race simulator for two wheeled vehicles such as motorcycles, in which case the dynamometer component may comprise a support platform that includes rollers for the front or rear wheel or both wheels of the motorcycle, or a rotatable platform type of movable support for both wheels.

The invention described herein is susceptible to variations, modifications and/or additions other than those specifically described above and it is to be understood that the invention includes all such variations, modifications and/or additions which fall within the scope of the following claims.

The claims defining the invention are as follows:

1. Apparatus for simulated driving of a motor vehicle, the motor vehicle having at least one drive wheel, the apparatus comprising:
   a support for rotatably supporting the drive wheel of the motor vehicle such that the motor vehicle remains stationary whilst a driver thereof controls the rotational speed of the drive wheel,
   the support including a securing mechanism for securing the motor vehicle to the support, the securing mechanism comprising a vehicle engaging component that is engageable with a structural part of the motor vehicle that is directly associated with the drive wheel such that a resilient suspension of the motor vehicle is not interposed to ensure the motor vehicle remains stationary whilst the drive wheel rotates, and an actuator for moving the vehicle engaging component into engagement with the structural part of the motor vehicle, wherein the actuator is operable to move the vehicle engaging component upwardly and downwardly relative to the support to apply an adjustable, selected holding down force to the motor vehicle during drive wheel rotation,
   a computer containing simulation software for generating virtual scenic imagery for the driver of the motor vehicle, and
   a visual display system comprising a viewing screen arrangement,
   wherein the support, the computer and the visual display system are operably interconnected for the simulation software to generate virtual scenic imagery on the viewing screen arrangement for viewing by the driver whilst the driver controls the rotational speed of the drive wheel, the virtual scenic imagery having a progression which is dependent upon the rotational speed of the drive wheel,
   wherein the viewing screen arrangement, in use of a motor vehicle with the apparatus, extends across the front of and extends respectively a distance along each side of the motor vehicle, and
   wherein the simulation software and visual display system generate virtual front and side scenic imagery for the driver on the viewing screen arrangement.

2. Apparatus as claimed in claim 1 wherein the visual display system comprises:
   three screen portions, one extending in front of the motor vehicle and one extending along each side of the motor vehicle, and
   three projectors, each for projecting virtual scenic imagery onto a respective one of the three screen portions to provide virtual scenic imagery that is integrated and spans at least about 180° relative to the driver in the motor vehicle.

3. Apparatus as claimed in claim 1 or claim 2 wherein the simulation software is for driver training and the apparatus includes a motor vehicle that is secured in position on the support to ensure that the motor vehicle remains stationary whilst the drive wheel rotates.

4. Apparatus as claimed in claim 3 further comprising:
   transducers for providing signals indicative of steering actions by the driver which are inputted into the computer.

5. Apparatus as claimed in claim 4 wherein the transducers are a pair of ultrasonic transducers.

6. Apparatus as claimed in claim 5 wherein the pair of ultrasonic transducers are each arranged to transmit, respectively, an ultrasonic signal onto a target location on a steerable wheel of the motor vehicle and to receive a reflected signal therefrom for providing an output electrical signal representative of the distance between the transducer and the target location, wherein, in use, the target locations are on the same side of and are oppositely spaced from a centre of the steerable wheel.

7. Apparatus as claimed in claim 6 wherein the output electrical signals from the pair of ultrasonic transducers are combined to derive a signal representative of the magnitude of turning movements of the steerable wheel about a generally vertical line through the centre of the steerable wheel, which combined signal is inputted into the computer.

8. Apparatus as claimed claim 6 wherein, in response to the electrical signals outputted by the pair of ultrasonic transducers, the simulation software generates the virtual scenic imagery on the viewing screen arrangement in synchronism with the steering actions of the driver.

9. Apparatus as claimed in claim 1 wherein the support is a chassis dynamometer.

10. Apparatus as claimed in claim 1 further comprising:
    a control system having a remote operating location for operating the securing mechanism to move the vehicle engaging component into engagement with the motor vehicle.

11. Apparatus as claimed in claim 10 further comprising:
    a video monitoring system for viewing the securing mechanism and providing a visual display thereof at the remote operating location of the control system for a human operator to monitor movement of the vehicle engaging component of the securing mechanism whilst operating the control system.

12. Apparatus as claimed in claim 1 or claim 2 wherein the simulation software is for drag racing.

13. Apparatus as claimed claim 1 or claim 2 wherein the simulation software is for driver training or racing and the apparatus further comprises:
    transducers for operable association with steering of the motor vehicle for providing signals of steering actions by the driver which are inputted into the computer.

14. Apparatus as claimed in claim 13 wherein the transducers are a pair of ultrasonic transducers.

15. Apparatus as claimed in claim 14 wherein the pair of ultrasonic transducers are arranged to transmit, respectively, an ultrasonic signal onto a target location on a steerable wheel of the motor vehicle and to receive a reflected signal therefrom for providing an output electrical signal representative of the distance between the transducers and the target location, wherein, in uses the target locations are on the same side of and are oppositely spaced from the centre of the steerable wheel.

16. Apparatus as claimed in claim 15 wherein the output electrical signals from the pair of ultrasonic transducers are combined to derive a signal representative of the magnitude of turning movements of the steerable wheel about a generally vertical line through the centre, which signal is inputted into the computer.

17. Apparatus as claimed in claim 15 wherein the computer is programmed for the output electrical signals to influence the simulation software such that the virtual scenic imagery on the viewing screen arrangement is deflected in synchronism with the steering actions of the driver.

18. Apparatus as claimed in claim 2, wherein the portion of the viewing screen arrangement that extends across the front of the motor vehicle can be raised and lowered, wherein, when the portion is in a raised position, the motor vehicle is drivable forwardly off the chassis dynamometer to exit the apparatus.

\* \* \* \* \*